(12) United States Patent
Kubendran et al.

(10) Patent No.: US 10,887,535 B2
(45) Date of Patent: Jan. 5, 2021

(54) QUERY DRIVEN IMAGE SENSING

(71) Applicant: THE REGENTS OF THE UNIVERSITY OF CALIFORNIA, Oakland, CA (US)

(72) Inventors: Rajkumar Kubendran, San Diego, CA (US); Gert Cauwenberghs, San Diego, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 16/515,808

(22) Filed: Jul. 18, 2019

(65) Prior Publication Data

US 2020/0029031 A1 Jan. 23, 2020

Related U.S. Application Data

(60) Provisional application No. 62/700,155, filed on Jul. 18, 2018.

(51) Int. Cl.
*H04N 5/345* (2011.01)
*H04N 5/343* (2011.01)
*H04N 5/378* (2011.01)
*H04N 5/351* (2011.01)

(52) U.S. Cl.
CPC .......... *H04N 5/345* (2013.01); *H04N 5/343* (2013.01); *H04N 5/351* (2013.01); *H04N 5/378* (2013.01)

(58) Field of Classification Search
CPC ........ H04N 5/345; H04N 5/343; H04N 5/351; H04N 5/378; H04N 5/3698; H04N 5/23241
USPC ....................................................... 348/308
See application file for complete search history.

(56) References Cited

U.S. PATENT DOCUMENTS

| | | | |
|---|---|---|---|
| 9,628,738 B2* | 4/2017 | Chen | H04N 5/3745 |
| 9,986,179 B2* | 5/2018 | Govil | H04N 5/345 |
| 10,237,481 B2* | 3/2019 | Newcombe | H04N 5/2351 |
| 10,466,779 B1* | 11/2019 | Liu | G02B 27/017 |
| 10,728,450 B2* | 7/2020 | Govil | G06K 9/00986 |
| 2014/0326854 A1* | 11/2014 | Delbruck | G01J 1/44 250/204 |
| 2016/0094787 A1* | 3/2016 | Govil | H04N 5/3745 348/310 |
| 2016/0094796 A1* | 3/2016 | Govil | H04N 5/3456 348/295 |
| 2016/0320834 A1* | 11/2016 | Lee | G06T 7/20 |
| 2017/0064211 A1* | 3/2017 | Omid-Zohoor | H04N 5/355 |
| 2017/0094249 A1* | 3/2017 | Maitan | H04N 13/204 |
| 2018/0191972 A1* | 7/2018 | Berner | H04N 5/3355 |
| 2018/0302562 A1* | 10/2018 | Newcombe | H04N 5/23245 |

* cited by examiner

*Primary Examiner* — Pritham D Prabhakher
(74) *Attorney, Agent, or Firm* — Eleanor Musick; Musick Davison LLP

(57) ABSTRACT

The multimodal query-driven imager provides efficient coding and streaming of visual information acquired directly on the focal plane. The query-driven approach to visual event coding uses clocked time-division multiplexing to continuously scan the array, querying each pixel for threshold change events in pixel intensity.

20 Claims, 4 Drawing Sheets

QUERY DRIVEN IMAGE SENSING

RELATED APPLICATIONS

The present application claims the benefit of the priority of Provisional Application No. 62/700,155, filed Jul. 18, 2018, which is incorporated herein by reference in its entirety.

FIELD OF THE INVENTION

The present invention relates to an imaging device with reduced data rate and power consumption based on activity-based event streaming.

BACKGROUND OF THE INVENTION

Ever since photo-transduction was demonstrated in CMOS technology, there has been a dramatic rise in a variety of image sensor hardware that can acquire the exposed image as frames in ever increasing pixel resolution, higher frame rates and consuming lower power per pixel. State of the art CMOS imagers are now ubiquitously used everywhere, such as high definition digital cameras, cameras in mobile phones, surveillance, drones, etc.

Traditional CMOS imagers have high pixel density but use frame scanning, with a global clock, to synchronize and stream out the pixel intensity data, which results in high data rate and hence higher power consumption. On the other hand, silicon retina chips use asynchronous methodology to stream out events only when they occur, therefore enabling a much lower output data rate. However, these retinal imagers have a large area and static power overhead per pixel, to handle event request and acknowledge handshaking, thus resulting in very low pixel density and still consuming more power.

For revolutionary future technologies like Internet of Things (IoT), micro sensors for biology, the energy efficiency and data rates of frame based image acquisition are still too high. Further, the raw data of each pixel frame after frame is mostly redundant and eventually dropped in the downstream pipeline while encoding with data compression algorithms e.g. MPEG2, MP4, H.264 etc. A better approach with much lower data rates can be inspired from biology. The retina with cone and rod bipolar cells connected through horizontal, vertical, and amacrine cells to the retinal ganglion cells in the optic nerve transmits electrical impulses proportional to the activity (temporal changes in intensity) observed. Translating to Dynamic Vision Sensors (DVS) in silicon hardware, the pixels need to raise an event request and receive an appropriate event acknowledge, which is handled through an asynchronous Address Event Representation (AER) protocol. This event driven imager would then send out event streams only when the events occur, thus the output data rate is directly dependent on activity. The power consumption and hence energy efficiency is still too high since the pixels now take up a large area and static current to handle events.

BRIEF SUMMARY

An effective solution to this problem that provides a superior tradeoff between data rates, energy efficiency and pixel density is described herein. The inventive approach employs more conventional frame scanning to query for events, albeit lowering data rate by only transmitting pixels which raised events and drastically improving energy efficiency by eliminating most of the static idle stand-by power in each pixel and by not having to handle events at the pixel level.

In an exemplary embodiment, the inventive imager hardware is query driven, providing for significant reduction in power consumption for given technology and pixel array resolution. The image sensor along with a controller in a feedback loop can demonstrate activity-based event streaming to monitor pixel activity and modulate clock frequency accordingly to reduce data rate and power consumption even further.

The inventive ultra-low power multimodal query-driven imager provides efficient coding and streaming of visual information acquired directly on the focal plane. The query-driven approach to visual event coding uses clocked time-division multiplexing (TDM) to continuously scan the array, querying each pixel within the array for threshold change events in pixel intensity. Digitally configurable functions of threshold detection and various forms of intensity coding are time-multiplexed at the periphery of the array, supporting large dynamic range while tracking fast transients in intensity through in-pixel temporal differencing.

The alternative query-driven approach of the invention substantially improves on the achievable density and energy efficiency of Dynamic Vision Sensors (DVS). Eliminating any overhead within the pixel for detection, arbitration, and handshaking of events that are required to continuously monitor and rapidly route events in event-driven DVS imaging systems, the pixel area and power consumption are substantially reduced.

In one aspect of the invention, an image sensor includes a pixel array with a plurality of pixels arranged in rows and columns, each pixel configured for generating a pixel signal corresponding to an intensity of the detected light impinging thereon; frame scanning circuitry in electrical communication with the pixel array, wherein the frame scanning circuitry sequentially queries each pixel to generate a pixel intensity signal; event detection circuitry in electrical communication with the pixel array, the event detection circuitry configured for continuously scanning the pixel array to query each pixel for a change event in which pixel intensity exceeds a threshold change from a prior pixel intensity signal for each pixel, and, if one or more pixels raises a change event, generating a relative temporal contrast signal corresponding to each of the one or more detected pixels; reset circuitry in electrical communication with the pixel array, the reset circuitry configured for zeroing temporal contrast upon detection of an event, by updating the prior pixel intensity signal with the current pixel intensity; and an output bus for generating an output data stream comprising one of the pixel intensity signal for each pixel in the array and the one or more relative temporal contrast signals. In some embodiments, the event detection circuitry uses clocked time-division multiplexing to continuously scan the pixel array. The pixel intensity signal may correspond of each of at least a portion of the plurality of pixels corresponds to a static background having no information therein. The change event may be one of an increase or a decrease in pixel intensity. Where the output data stream is the pixel intensity signal for each pixel in the array, the readout may be a multi-bit readout and may be read out in one of a logarithmic intensity mode and an integrate intensity mode. Where the output data stream is the one or more relative temporal contrast signals, the readout may be a 2-bit readout: amplitude (0 or 1), and polarity (−1 or +1) for a total of three output levels (−1, 0, or +1). The threshold may be user defined based on a detected level of activity.

In another aspect of the invention, a method for image sensing includes detecting light impinging upon an image sensor comprising a pixel array of a plurality of pixels, each pixel configured for generating a pixel signal corresponding to a pixel intensity of detected light, wherein the sensor is configured to execute a query-driven approach to visual event coding using clocked time-division multiplexing to: continuously scan the array and query each pixel for threshold change events in pixel intensity from a prior pixel intensity; output a data stream comprising data associated with one or more pixels in the array having experienced a change event exceeding the threshold; and update the prior pixel intensity to a current pixel intensity if a change event is detected in the one or more pixels.

The pixel intensity may correspond of each of at least a portion of the plurality of pixels corresponds to a static background having no information therein. The change event may be one of an increase or a decrease in pixel intensity. Where the output data stream is the pixel intensity for each pixel in the array, the readout may be a multi-bit readout and may be read out in one of a logarithmic intensity mode and an integrate intensity mode. Where the output data stream is the one or more relative temporal contrast signals, the readout may be a 2-bit readout. The threshold may be user defined based on a detected level of activity.

In still another aspect of the invention, a method for coding and streaming data acquired by a pixel array includes scanning the array and querying each pixel in the array for change events in pixel intensity that exceed a threshold; outputting data only associated with one or more pixels in the array having a change event that crosses the threshold; and updating the prior pixel intensity to a current pixel intensity if a change event is detected in the one or more pixels. The change event may be one of an increase or a decrease in pixel intensity. Where the output data stream is the pixel intensity signal for each pixel in the array, the readout may be a multi-bit readout and may be read out in one of a logarithmic intensity mode and an integrate intensity mode. Where the output data stream is the one or more relative temporal contrast signals, the readout may be a 2-bit readout.

The inventive query-driven approach to image acquisition offers an optimal tradeoff between the above two approaches. This method uses synchronous clocks to scan the pixel array and query each pixel for events, which can be an increase or decrease in pixel intensity. The pixel occupies medium area with no overhead for event handshaking and event routing through arbitration. The output data stream consists of only those pixels which raised an event and the dormant pixels are automatically ignored, hence resulting in activity based event streaming which reduces the data rate significantly. The biggest advantage of this technique is the tremendous gain in energy efficiency by reducing the overall power consumption by almost 10× over the state-of-the-art DVS imagers, doing away with static idle standby power and event coding/registration power in each pixel, and drastically reducing the scan power through voltage-clamping on the output lines. The ultra-low power operation and activity based output streaming makes this hardware architecture ideal for myriad applications in security surveillance, drone navigation, and other domains requiring rapid tracking and logging of visual events.

DETAILED DESCRIPTION OF EMBODIMENTS OF THE INVENTION

In an exemplary embodiment, the hardware architecture of the inventive query driven imager includes a pixel array with active pixel sensors.

Figure 1:
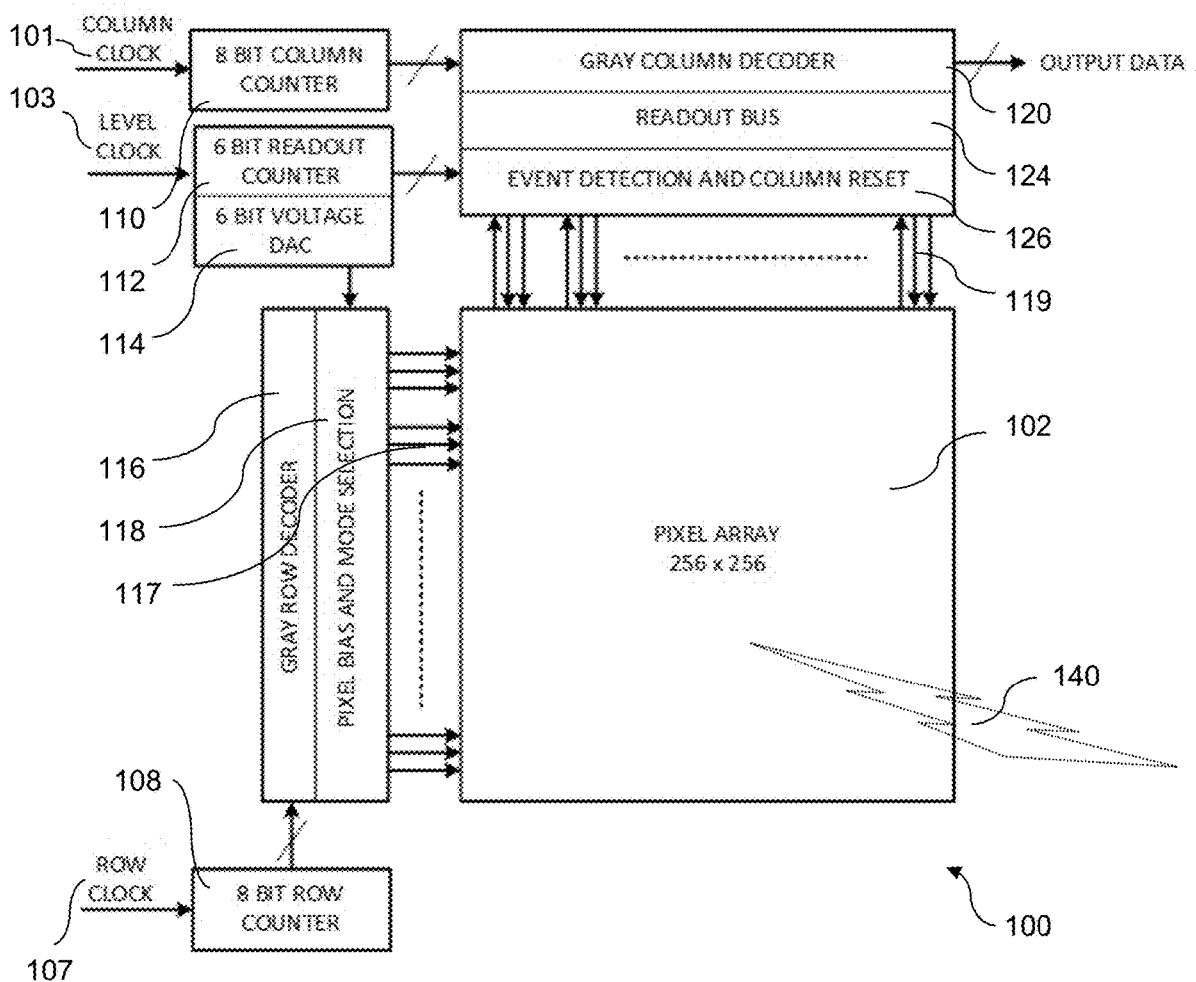
FIG. 1 is a block diagram of the overall chip architecture according to an embodiment of the invention.

FIG. 1 provides an exemplary overall architecture for an image sensor chip 100 according to an embodiment of the invention. In the illustrative example described herein, the pixel array 102 is 256×256. It will be readily apparent to those of skill in the art that the array dimensions are intended to be an example only and that the inventive scheme may be applied to different pixel array sizes.

The sensor chip 100 includes a pixel array 102 formed thereon and a peripheral circuit assembly integrated thereon. The pixel array 102 includes a plurality of unit pixels (not shown separately), each including a photoelectric conversion element, two-dimensionally arranged within the array. Each unit pixel photoelectrically converts visible light 140 incident thereon into electrical charge in accordance with the intensity of the visible light.

The peripheral circuit assembly includes column drive elements: column counter 110 (triggered by column clock 101), column decoder 120, and event detection/column reset 126 connected to the pixel columns in pixel array 102 by pixel drive lines 119; and row drive elements: row counter 108 (triggered by row clock 107), row decoder 116 and pixel bias/mode selection 118, connected to the pixel rows in pixel array 102 by pixel drive lines 117.

The imager includes two modes of operation, the traditional frame scanning mode and the inventive query driven readout mode. The pixels in array 102 are accessed by row and column decoders 116 and 120, respectively, which receive gray coded inputs from counters 108 and 110, respectively, to minimize glitches during switching from one row/column to another. Three external clocks 101, 103 and 107 trigger gray counters whose output address codes are used to traverse the rows and columns and to read out pixel density data. Row decoder 116 selects one row at a time, during which all the columns are queried one after another. Depending on the mode of operation, either the absolute pixel intensity or the relative temporal contrast is read out from each pixel per column.

Figure 2:
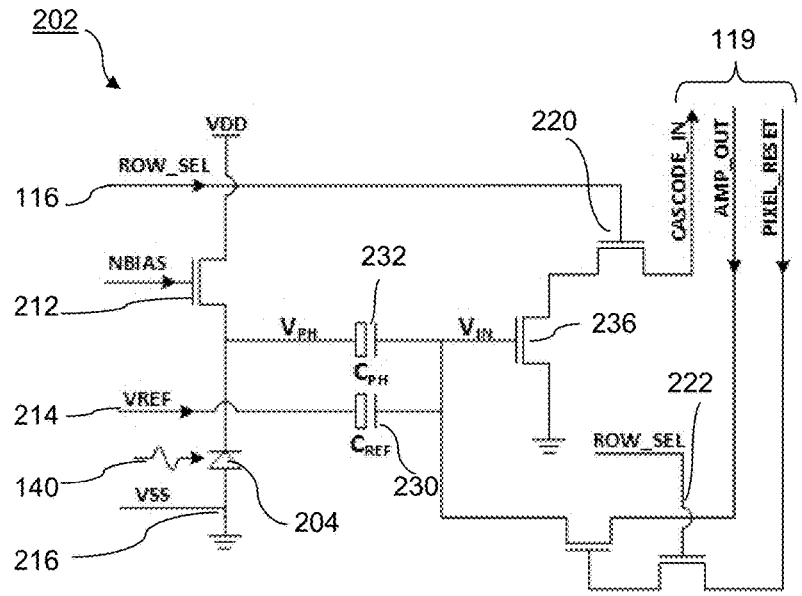
FIG. 2 illustrates an exemplary schematic circuit of a pixel with four horizontal and four vertical signals that are shared throughout the array.

Referring to FIG. 2, which provides an exemplary schematic circuit of a unit pixel 202 within array 102. Photodiode 204 converts light 140 impinging on it into photocurrent corresponding to the amount of received light. The anode of photodiode 204 is connected to ground (VSS) 216 while the cathode is connected to the source of pull-up NMOS transistor 212. The drain of transistor 212 is connected to pixel power supply VDD. The readout value of photodiode 204 is determined by tuning VREF 214, which is row-wise capacitively coupled via CREF 230 and CPH 232 to the photodiode voltage VPH to set the input voltage VIN to the column readout amplifier (event detection/ column reset 126). Row select transistors 220 and 222 respond to signals from row decoder 116.

In the frame scanning mode, the absolute values of pixel intensity are read out from each pixel 202. The pixel intensity is determined by using a voltage ramp as VREF 214. The ramp is generated using a resistive voltage DAC 114 which is modulated by a 6-bit counter 112. The readout value is the 6-bit counter value at which the column readout amplifier 126 toggles, thus raising an event that triggers the latch 338 and tristate buffer 342 (shown in FIG. 3) to send out the data on the output bus 124.

In the query driven readout mode, events 322 are readout as 2 bits, depending on whether there was an increase, decrease, or no change in pixel intensity. Any pixel in a selected row can raise an event depending on whether the intensity of light impinging on the pixel has decreased or increased, compared to the previous level of intensity at that same pixel. An event is determined by using a two-level voltage test input as VREF 214, i.e., VUP and VDN. The positive and negative level-crossing thresholds for change detection are user-defined parameters in the system and can be dynamically adapted based on the level of activity detected. For example, if no change events are detected, the threshold(s) should be decreased. On the other hand, if a flood of events come in, the threshold should be increased.

Figure 3:
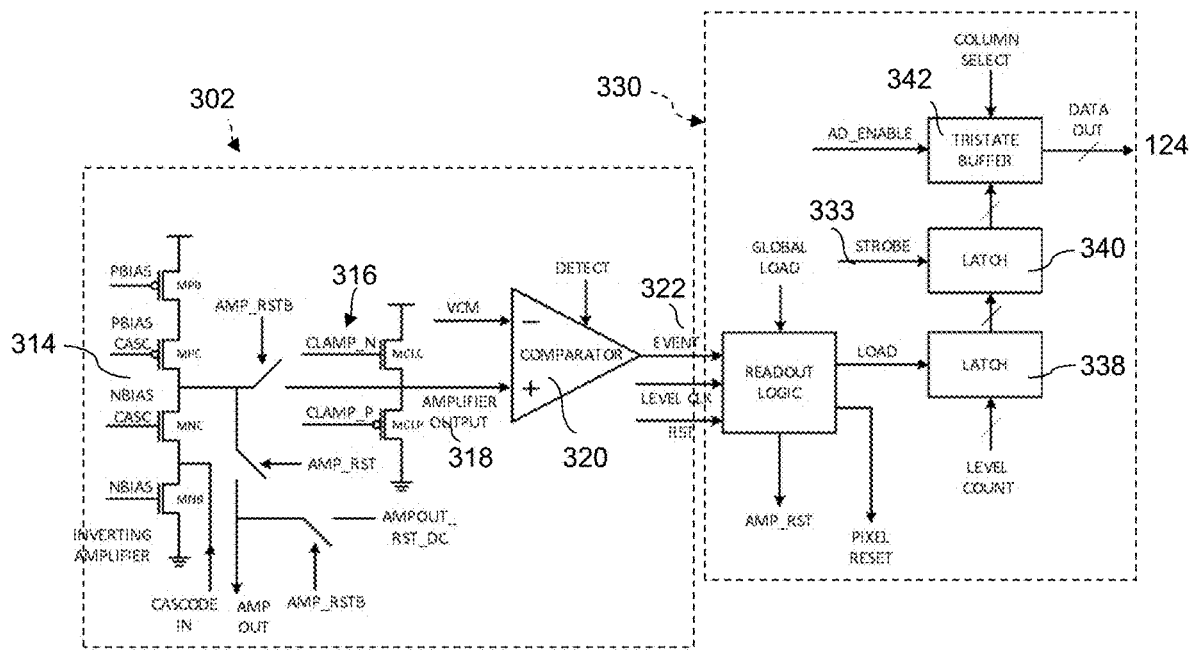
FIG. 3 is a block diagram for a Readout circuit according to one embodiment showing how queried pixel events are latched to the readout bus with global control signals.

FIG. 3 is the readout circuit diagram that shows how the queried pixel events are latched to readout bus 124 with global control signals.

The pixel intensity readout can be done in two ways—logarithmic mode or integrate mode. The pixel mode is defined by the row-wise bias voltage, NBIAS, chosen for the pullup NMOS transistor 212 connected to the photodiode. The different modes are shown in Table 1. The pixel has been designed to minimize area by using a MOSCAP (metal-oxide-semiconductor capacitor) structure for high density capacitive input coupling, avoiding the use of PMOS transistors since they require an NWELL boundary, and avoiding the need for a source follower transistor to isolate the photodiode node, VPH. Also, a local Reset for the pixel is generated by combining Row Select and Column Reset.

TABLE 1

| Mode | Row Select | GATE_NBIAS | NBIAS |
| --- | --- | --- | --- |
| Logarithmic | 0 | X | NBIAS_LOW |
|  | 1 | 1 | NBIAS_HIGH |
| Integrate | 0 | X | LOW |
|  | 1 | 0 | LOW |
|  |  | 1 | HIGH |

A column readout circuit 302 is used to amplify the pixel photodiode voltage and detect events. The pixel readout circuit consists of a Gm-boosted high-gain cascode amplifier 314 (Gain>90 dB) along with a clamp 316 to set input DC bias, and a dynamic comparator 320, with no DC bias current, to compare the amplifier output 318 with a common-mode voltage, VCM. The power budget is carefully planned for each column. With a low supply voltage of 1V and only 120 nA bias current per column, the power consumed per active column is only 120 nW. The bias current per column includes a 20 nA trickle current to guarantee proper biasing of the amplifier even if no pixel in the column raises an event.

An Event Readout circuit 330 cascades the column readout circuit. This circuit generates a column-wise load signal to latch the event onto the strobe latch 340, column-wise reset signal to reset the pixel. The load signal is generated using SR latches and combinational logic with separate clock for output code readout. A global strobe signal 333 synchronized with the readout clock is used to latch the event to the output bus 124, which is driven by tristate buffers 342. The output bus 124 can be 6-bit wide for frame-based absolute intensity readout or 2-bit wide for event based readout—intensity up, down or no change.

Figure 4:
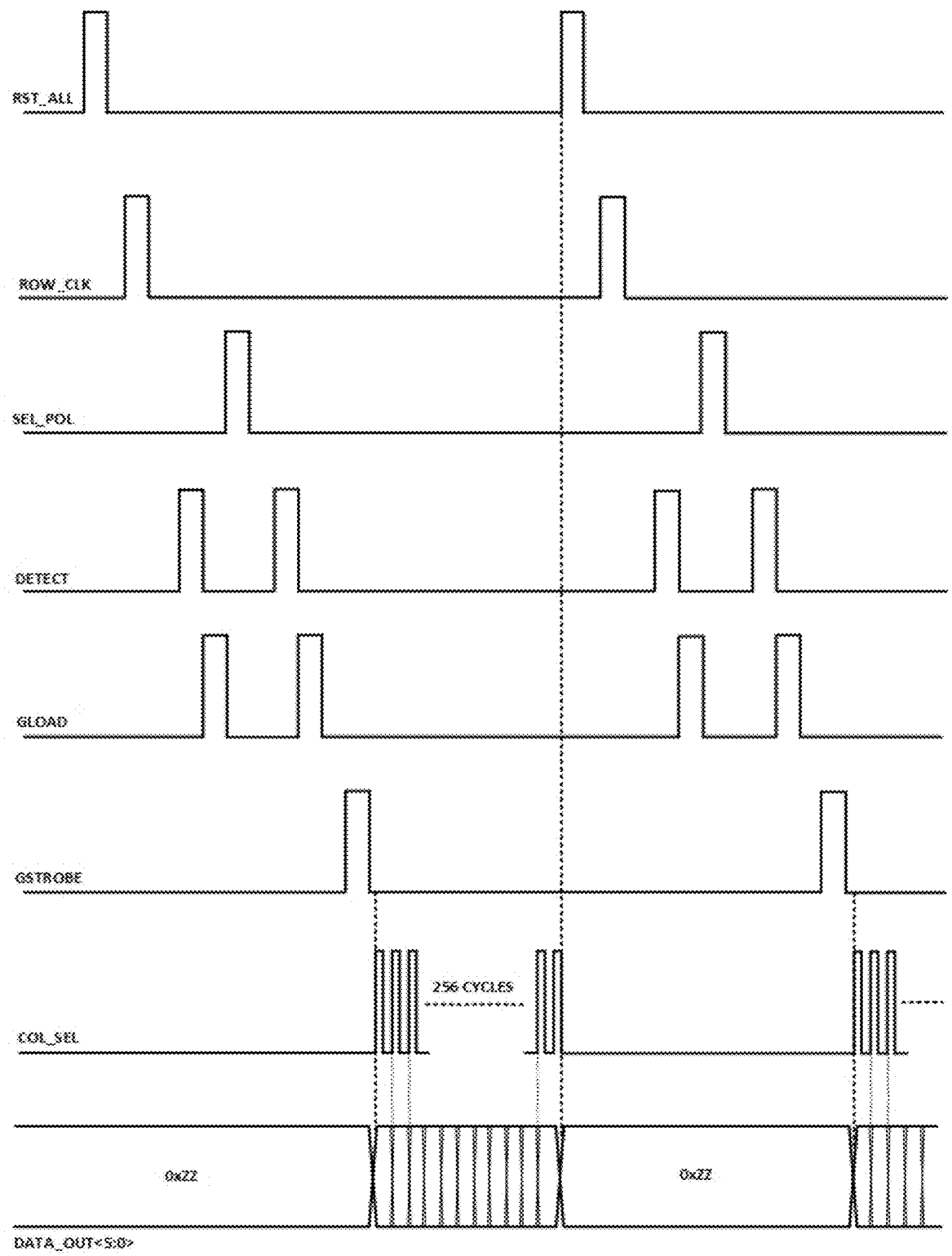
FIG. 4 is a timing waveform diagram showing how event data is loaded onto the readout bus.

FIG. 4 is a timing waveform diagram showing how event data is loaded onto the 6 bit readout bus 124 through LOAD and STROBE signals. The CODE_INC clock is used by a 6 bit counter 112 to generate the SCAN_CTR[5:0] bus, which is the event data loaded to DATA_OUT[5:0] bus. The AD_ENABLE signal chooses the mode of operation between frame scanning (6 bit pixel intensity readout) and temporal contrast (2 bit pixel event readout).

Figure 5:
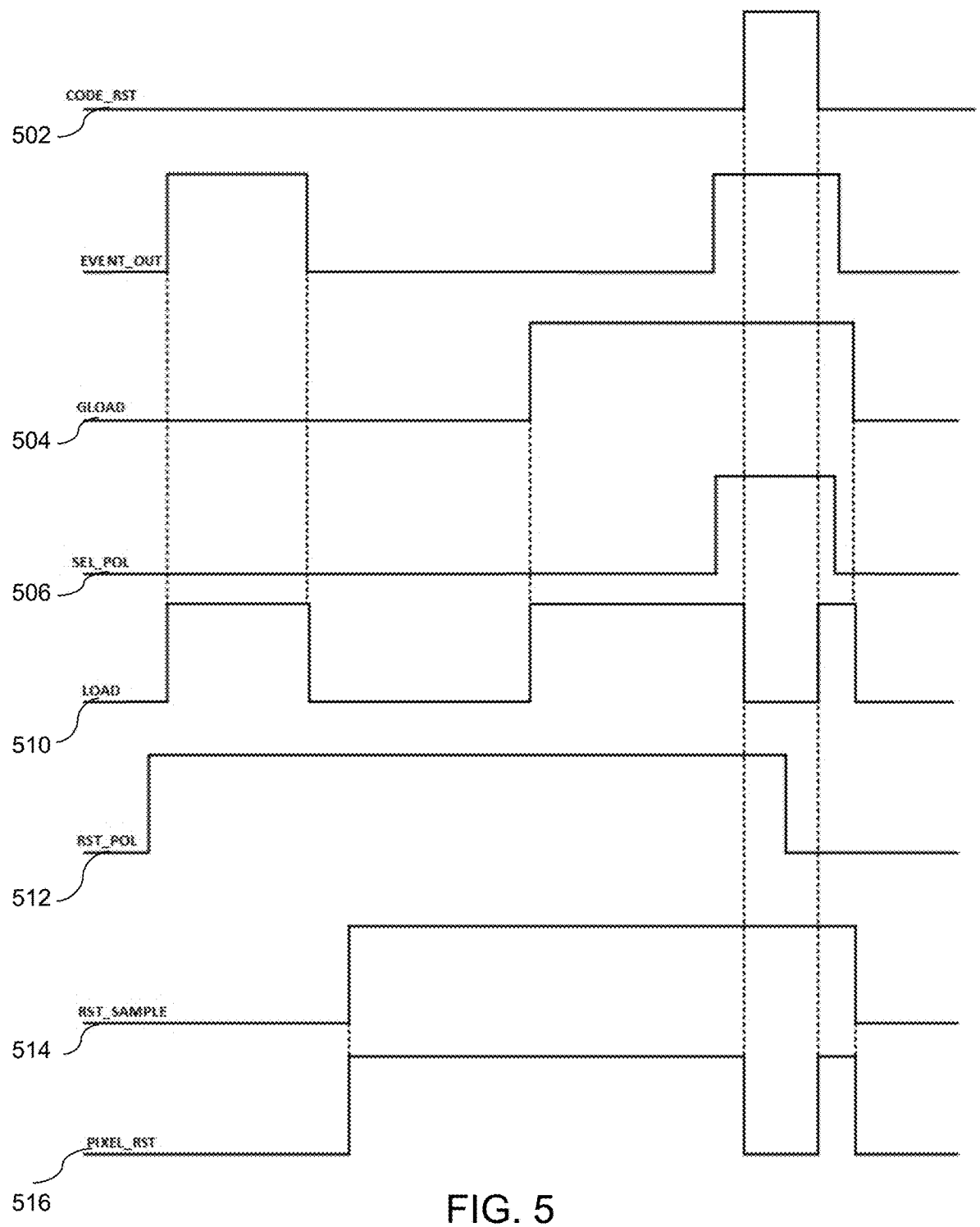
FIG. 5 is a timing diagram describing the event readout logic.

FIG. 5 provides a timing diagram describing the event readout logic, which uses GLOAD 504 and SEL_POL 506 to generate the LOAD signal 510 to latch the event to the output bus 124. Also, RST_POL 512 and RST_SAMPLE 514 are used to generate the PIXEL_RST signal 516 to reset the pixel after readout. The CODE_RST signal 502 can be used to reset the logic and start a new cycle of event readout.

The overall power consumption of the imager chip is budgeted as follows:

1. The nominal supply voltage is 1V to reduce power.
2. Only one of the 256 columns is queried at a time, so one column consumes 100 nA while all others consume a trickle current of about 20 nA. As a result, the total current consumed by pixel array is 256×20 nA+100 nA=5220 nA=5.22 µA. Power consumed is 5.22 µW
3. The row, column and readout clock frequencies are nominal at 100 MHz. Assuming overall capacitance of all digital logic and readout bus to be around 1 pF, the digital power consumed is $f_{clk} \times C_{total} \times VDD^2 = 100$ MHz×1 pF×1V$^2$=100 µW.
4. Total power budget=106.22 µW. This is in close agreement with experimentally measured data.

The above-described query driven image acquisition scheme employs a tradeoff between the two approaches. The inventive approach uses synchronous clocks to scan the pixel array and query each pixel for "events", which can be an increase or decrease in pixel intensity. The output data stream consists of only those pixels that experienced an event; dormant pixels are automatically ignored, thus resulting in activity-based event streaming which reduces the data rate significantly. The biggest advantage of this technique is the tremendous gain in energy efficiency by reducing the overall power consumption by almost 10× than the state of the art imagers. The ultra-low power operation and activity-based output streaming makes this hardware architecture ideal for myriad applications in security surveillance, drone navigation, and other domains requiring rapid tracking and logging of visual events.

As will be understood by those skilled in the art that various modifications, combinations, sub-combinations and alterations may occur depending on design requirements and other factors insofar as they are within the scope of the appended claims or the equivalents thereof.

REFERENCES (INCORPORATED HEREIN BY REFERENCE)

[1] O. Pecht, R. Cummings, "*CMOS Imagers: From Phototransduction to Image Processing*," Kluwer Academic Publishers.

[2] T. Delbruck, "Frame-free dynamic digital vision," in *Proc. Int. Symp. Secure-Life Electron., Adv. Electron. for Quality Life and Soc.*, 2008, vol. 1, pp. 21-26.

[3] T. Delbruck, B. Linares-Barranco, E. Culurciello, and C. Posch, "Activity-driven, event-based vision sensors," in *Proc. IEEE Int. Symp. Circuits Syst.*, 2010, pp. 2426-2429.

[4] M. Yang, et al., "A Dynamic Vision Sensor With 1% Temporal Contrast Sensitivity and In-Pixel Asynchronous Delta Modulator for Event Encoding," *IEEE J. Solid-State Circuits*, vol. 50, no. 9, pp. 2149-2160, September 2015.

[5] Y. Chi, et al., "CMOS Camera with In-Pixel Temporal Change Detection and ADC," *IEEE J. Solid-State Circuits*, vol 42 (1), pp. 2187-2196, 2007.

The invention claimed is:

1. An image sensor, comprising:
a pixel array comprising a plurality of pixels arranged in rows and columns, each pixel configured for generating a pixel signal corresponding to an intensity of the detected light impinging thereon;
frame scanning circuitry in electrical communication with the pixel array, wherein the frame scanning circuitry sequentially queries each pixel to generate a pixel intensity signal;
event detection circuitry in electrical communication with the pixel array, the event detection circuitry configured for continuously scanning the pixel array to query each pixel for a change event in which pixel intensity exceeds a threshold change from a prior pixel intensity signal for each pixel, and, if one or more pixels raises a change event, generating a relative temporal contrast signal corresponding to each of the one or more detected pixels;
reset circuitry in electrical communication with the pixel array, the reset circuitry configured for zeroing temporal contrast upon detection of an event, by updating the prior pixel intensity signal with the current pixel intensity; and
an output bus for generating an output data stream comprising one of the pixel intensity signal for each pixel in the array and the one or more relative temporal contrast signals.

2. The image sensor of claim 1, wherein the event detection circuitry uses clocked time-division multiplexing to continuously scan the pixel array.

3. The image sensor of claim 1, wherein the pixel intensity signal of each of at least a portion of the plurality of pixels corresponds to a static background having no information therein.

4. The image sensor of claim 1, wherein the change event comprises one of an increase or a decrease in pixel intensity.

5. The image sensor of claim 1, wherein the output data stream is the pixel intensity signal for each pixel in the array and has a multi-bit readout.

6. The image sensor of claim 5, wherein the pixel intensity signal is read out in one of a logarithmic intensity mode and an integrate intensity mode.

7. The image sensor of claim 1, wherein the output data stream is the one or more relative temporal contrast signals and has a 2-bit readout.

8. The image sensor of claim 1, wherein the threshold is user defined based on a detected level of activity.

9. A method for image sensing, comprising
detecting light impinging upon an image sensor comprising a pixel array of a plurality of pixels, each pixel configured for generating a pixel signal corresponding to a pixel intensity of detected light, wherein the sensor is configured to execute a query-driven approach to visual event coding using clocked time-division multiplexing to:
continuously scan the array and query each pixel for threshold change events in pixel intensity from a prior pixel intensity;
output a data stream comprising data associated with one or more pixels in the array having experienced a change event exceeding the threshold; and
update the prior pixel intensity to a current pixel intensity if a change event is detected in the one or more pixels.

10. The method of claim 9, wherein the pixel signal of each of at least a portion of the plurality of pixels corresponds to a static background having no information therein.

11. The method of claim 9, wherein the change event comprises one of an increase or a decrease in pixel intensity.

12. The method of claim 9, wherein the output data stream is the pixel signal for each pixel in the array and has a multi-bit readout.

13. The method of claim 12, wherein the pixel signal is read out in one of a logarithmic intensity mode and an integrate intensity mode.

14. The method of claim 9, wherein the output data stream is the one or more relative temporal contrast signals and has a 2-bit readout.

15. The method of claim 9, wherein the threshold is user defined based on a detected level of activity.

16. A method for coding and streaming data acquired by a pixel array, the method comprising:
continuously scanning the array and querying each pixel in the array for change events in pixel intensity that exceed a threshold;
outputting data only associated with one or more pixels in the array having a change event that crosses the threshold; and
updating the prior pixel intensity to a current pixel intensity if a change event is detected in the one or more pixels.

17. The method of claim 16, wherein the change event comprises one of an increase or a decrease in pixel intensity.

18. The method of claim 16, wherein the output data stream is the pixel signal for each pixel in the array and has a multi-bit readout.

19. The method of claim 18, wherein the pixel signal is read out in one of a logarithmic intensity mode and an integrate intensity mode.

20. The method of claim 16, wherein the output data stream is the one or more relative temporal contrast signals and has a 2-bit readout.

* * * * *